Patented Feb. 11, 1930

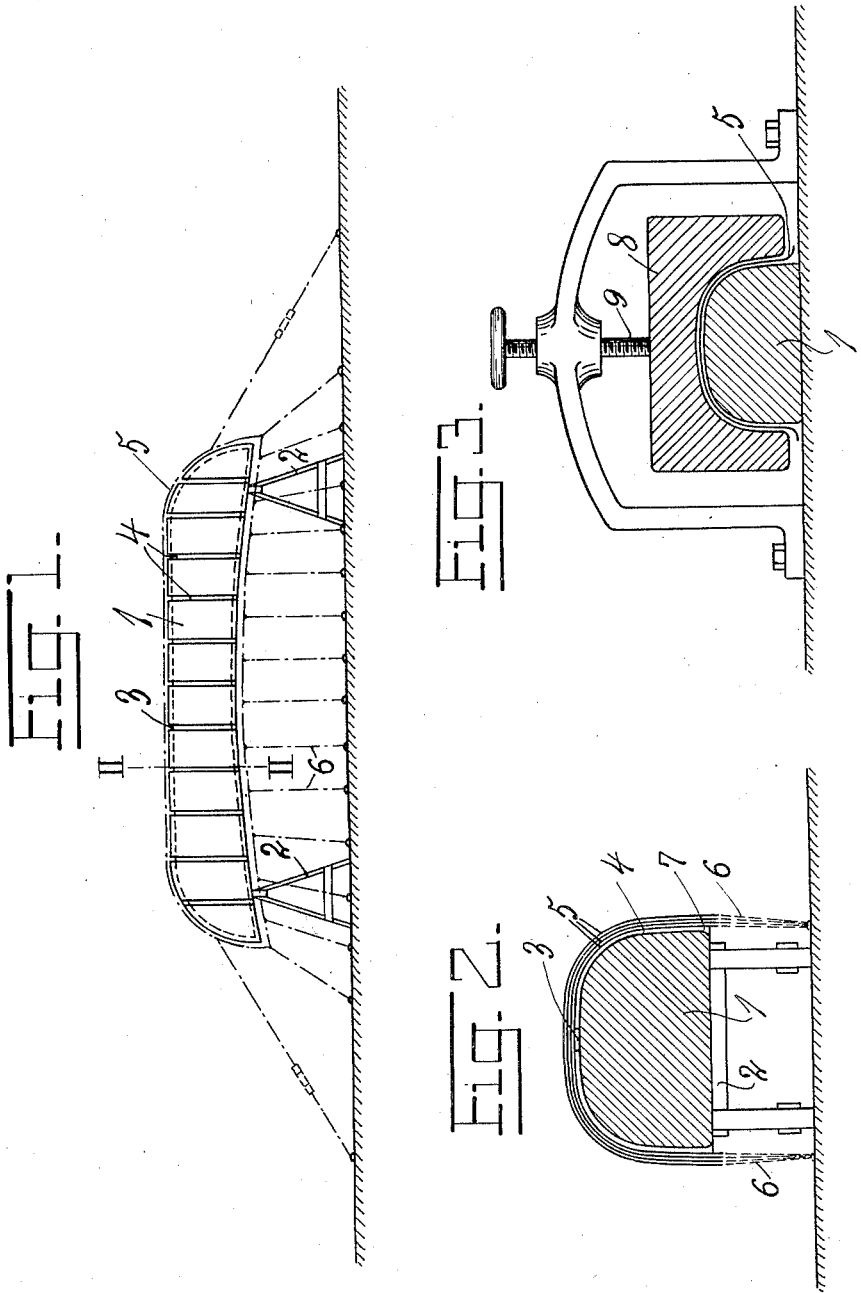

1,746,755

UNITED STATES PATENT OFFICE

ANDERS NICOLAY ANDERSEN, OF HOKKSUND, NORWAY

BOAT, CANOE, AND OTHER CRAFT, AEROPLANE BODY, AND THE LIKE AND METHOD OF MANUFACTURING SAME

Application filed September 6, 1927, Serial No. 217,816, and in Norway September 13, 1926.

My invention relates to the manufacture of such smaller craft as life boats, canoes, aeroplane and automobile bodies that are formed by stretching or pressing successive layers, coated or impregnated with a hardening composition, over a mould corresponding to the interior form of the boat etc., to be manufactured, until the layers thus united have attained a sufficient thickness.

Now, according to my invention I use as basic material, canvas or a similar woven texture, which is impregnated with a composition that is better suited than those hitherto proposed to make the craft impervious to heat and moisture as well as sufficiently strong to be able to resist heavy strains.

In the following I shall explain my method with reference to the accompanying drawings in which Fig. 1 is a diagrammatic side view of a boat under formation on a mould in accordance with my invention. Fig. 2 is a corresponding cross sectional view in a larger scale on line II—II in Fig. 1. Fig. 3 is a cross sectional view of a press used for a modified form of my method.

In Figs. 1 and 2, 1 is the mold, over which the stretching of the canvas is effected. It reposes on two or more supports or standards 2, and is provided with a longitudinal groove 3 for the keel and stern, respectively, and with a number of transverse grooves 4 for the frames. Prior to the beginning of the canvas stretching operation I place in these grooves 3 and 4 respectively keel and frames of wood, iron or other suitable material. After having thus placed the keel and the frames in position in the mold and interconnected then I stretch, one by one, layers 5 of canvas or other suitable woven fabric, which are coated or impregnated with a composition, consisting of a mixture of magnesite, and chlorite of magnesium, which I have found especially suited for this purpose.

In order to make the successive layers of canvas to conform strictly to the mold 1 I use a number of lines 6, which I fasten to the edges of the canvas and stretch to hooks or the like, arranged in the floor of the workshop. These lines may if desired be provided with stretching screws or similar stretching appliances. When a canvas layer has thus been properly stretched over the mold, it is, if not previously impregnated, given a coating of the composition above mentioned, whereupon the next layer of canvas is stretched over it, and so on, until a sufficient thickness—for instnce from 1 to 2 inches—has been obtained. Gunwales 7 may also be fastened in corresponding grooves of the mold 1, and be connected with the successive layers through the stretching and coating operations. The last—outer—canvas layer may, if desired be provided with a suitable coating of a glacing material whereupon the whole structure is left on the mold until the hardening or setting process has proceeded so far as to allow the lifting off of the boat body thus formed from the mold.

In very small boats, as canoes and the like, I may dispense with the laying in of separate keel and frames of wood or other material, keel and frames being also made from canvas, said strips of canvas being impregnated in the same manner as the successive layers of canvas 5 and placed into the grooves 3 and 4 of the mold 1, to be subsequently cast or glued together with the layers of canvas.

Instead of stretching the successive layers of canvas by aid of lines 6 or the like I may also press said layers together by aid of a press mold 8, as indicated in Fig. 3, said press mold being pressed against the successive layers of canvas by aid of one or more screws 9.

By this method I have succeeded in manufacturing boats of great tightness, being nevertheless impervious to the influence of the sun and of sufficient strength to withstand heavy strains, such as bumping against a ship's side or the like.

It will be understood that I may also manufacture by this method aeroplane bodies, and similar objects that are to be exposed to heavy strains, but must at the same time have a minimum of weight.

Claims—

1. In an apparatus for the manufacture of boats from layers of fabric, a mold having transverse and longitudinal recesses to receive and retain the transverse and longitudinal frame members of the boat in position during manufacture, and means for stretching fabric upon said molds.

2. In an apparatus for the manufacture of boats from layers of fabric, a mold having transverse and longitudinal recesses to receive and retain the transverse and longitudinal frame members of the boat in position during manufacture, and means for stretching fabric upon said molds, said stretching means being independent of the frame members of the boat.

In testimony whereof I have signed my name to this specification.

ANDERS NICOLAY ANDERSEN.